United States Patent
Kim

(10) Patent No.: US 10,967,787 B2
(45) Date of Patent: Apr. 6, 2021

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Youngbeom Kim, Bucheon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 16/570,374

(22) Filed: Sep. 13, 2019

(65) Prior Publication Data

US 2021/0001770 A1    Jan. 7, 2021

(30) Foreign Application Priority Data

Jul. 1, 2019 (KR) .................. 10-2019-0078614

(51) Int. Cl.
*B60Q 5/00* (2006.01)
*G10K 11/34* (2006.01)

(52) U.S. Cl.
CPC ............ *B60Q 5/008* (2013.01); *G10K 11/343* (2013.01); *G10K 2210/1082* (2013.01); *G10K 2210/3014* (2013.01)

(58) Field of Classification Search
CPC combination set(s) only.
See application file for complete search history.

(56) References Cited

U.S. PATENT DOCUMENTS

| 8,862,299 | B2 * | 10/2014 | Ricci | ............. | B60R 7/04 |
| | | | | | 701/22 |
| 2015/0139442 | A1 * | 5/2015 | Kreifeldt | ............. | G10K 15/02 |
| | | | | | 381/86 |
| 2019/0389376 | A1 * | 12/2019 | Kreifeldt | ............. | B60Q 5/008 |

* cited by examiner

*Primary Examiner* — Travis R Hunnings
(74) *Attorney, Agent, or Firm* — Brinks Gilson & Lione

(57) ABSTRACT

A vehicle and a method of controlling the vehicle for adjusting a sound pressure of a virtual engine sound based on external noise are provided. The vehicle may include: a speaker to output a virtual engine sound; a microphone to receive external sound generated outside of the vehicle; and a controller configured to extract noise by separating the virtual engine sound from the external sound, determine each peak sound pressure of a plurality of peak sound pressures as a peak point, identify a plurality of equalizer (EQ) filters having a predetermined bandwidth, generate an amplification filter by combining the plurality of EQ filters, apply the amplification filter to the virtual engine sound and control the speaker to output the virtual engine sound.

18 Claims, 7 Drawing Sheets

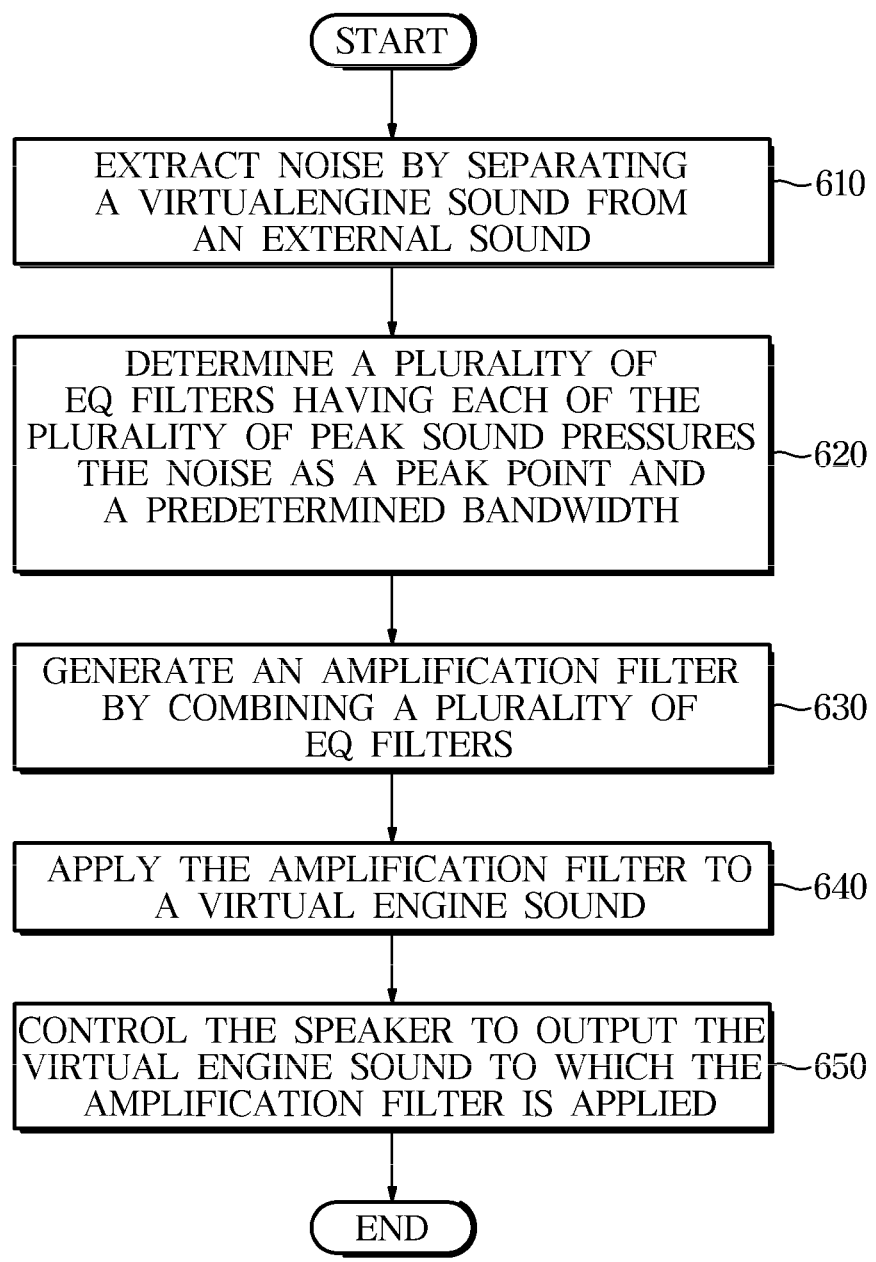

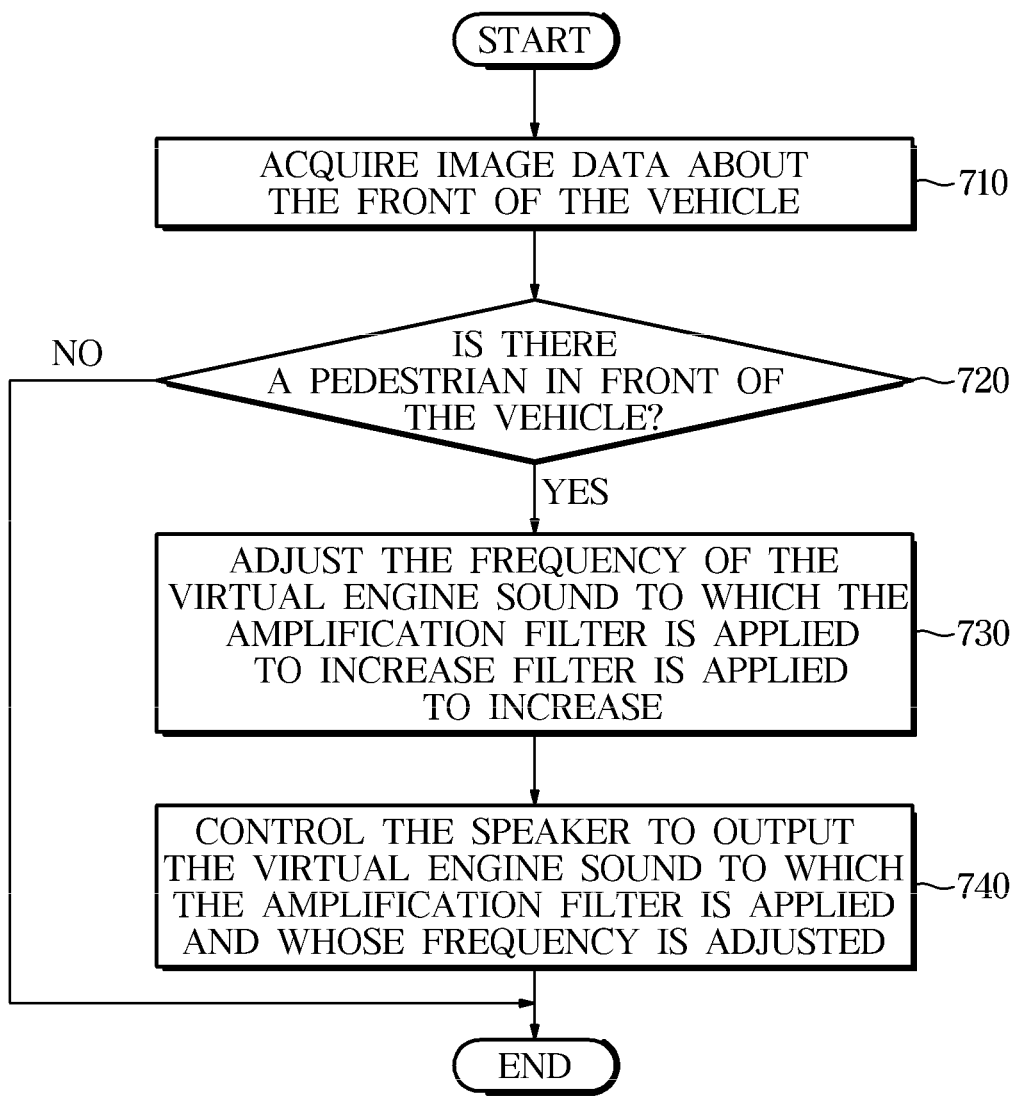

VEHICLE AND METHOD OF CONTROLLING THE SAME

CROSS-REFERENCE TO RELATED APPLICATION

The present application claims priority to and the benefit of Korean Patent Application No. 10-2019-0078614, filed on Jul. 1, 2019, which is incorporated herein by reference in its entirety.

TECHNICAL FIELD

The present disclosure relates to a vehicle and a method of controlling the same for outputting a virtual engine sound.

BACKGROUND

The statements in this section merely provide background information related to the present disclosure and may not constitute prior art.

In general, the electric power vehicle may be driven by a motor, and may generate little noise depending on the low noise characteristic of the motor. Accordingly, since the noise is small even when the electric power vehicle approaches, the pedestrian may not notice and the probability of an accident may increase.

Recently, a virtual engine sound system (VESS) that virtually outputs engine sound so that pedestrians can recognize the approach of the electric power vehicle has been installed in the electric power vehicle.

Recently, a technology for amplifying a virtual engine sound based on a frequency average of ambient noise by collecting ambient noise through a microphone of a vehicle has also been developed. However, despite the amplification through the frequency average, distortion due to the masking effect may occur.

The method of creating an amplified equalizer equal to the ambient noise is problematic in terms of computational speed and design cost because it requires an infinite number of digital filters. In the amplification method for each band, unnecessary sound pressure may be amplified to cause distortion of the virtual engine sound.

SUMMARY

Therefore, it is an aspect of the disclosure to provide a vehicle and a method of controlling the same for adjusting a sound pressure of a virtual engine sound based on external noise.

In accordance with an aspect of the disclosure, a vehicle includes: a speaker to output a virtual engine sound; a microphone to receive external sound generated outside of the vehicle; and a controller configured to extract noise by separating the virtual engine sound from the external sound, determine a plurality of EQ (equalizer) filters having each of the plurality of peak sound pressures of the noise as a peak point and a predetermined bandwidth, generate an amplification filter by combining the plurality of EQ filters, apply the amplification filter to the virtual engine sound and control the speaker to output the virtual engine sound to which the amplification filter is applied.

The controller is configured to separate the noise into a plurality of regions according to frequency and determine at least one peak sound pressure in each of the plurality of regions.

The controller is configured to separate a region corresponding to a frequency range in which the virtual engine sound is output among the noise into a plurality of regions.

The controller is configured to separate the noise into a plurality of regions based on a logarithmic scale.

The controller is configured to determine the peak sound pressure such that a frequency between peak sound pressures in the same region is equal to or greater than a critical bandwidth.

The EQ filter is any one of a masking curve having a frequency corresponding to the peak sound pressure as a center frequency, an A-weighting filter, or a B-weighting filter.

The vehicle further includes: a camera to acquire image data of the front of the vehicle.

The controller is configured to determine whether a pedestrian is present in front of the vehicle based on the image data.

The controller is configured to adjust the frequency of the virtual engine sound to which the amplification filter is applied when the pedestrian is present in front of the vehicle to increase.

The controller is configured to control the speaker to output a virtual engine sound to which the amplification filter is applied and whose frequency is adjusted.

In accordance with an aspect of the disclosure, a method of controlling the vehicle including a speaker to output a virtual engine sound and a microphone to receive external sound generated outside of the vehicle, includes: extracting noise by separating the virtual engine sound from the external sound; determining a plurality of EQ (equalizer) filters having each of the plurality of peak sound pressures of the noise as a peak point and a predetermined bandwidth; generating an amplification filter by combining the plurality of EQ filters; applying the amplification filter to the virtual engine sound; and controlling the speaker to output the virtual engine sound to which the amplification filter is applied.

The method further includes: separating the noise into a plurality of regions according to frequency; and determining at least one peak sound pressure in each of the plurality of regions.

The separating the noise into a plurality of regions according to frequency includes: separating a region corresponding to a frequency range in which the virtual engine sound is output among the noise into a plurality of regions.

The separating the noise into a plurality of regions according to frequency includes: separating the noise into a plurality of regions based on a logarithmic scale.

The determining at least one peak sound pressure in each of the plurality of regions includes: determining the peak sound pressure such that a frequency between peak sound pressures in the same region is equal to or greater than a critical bandwidth.

The EQ filter is any one of a masking curve having a frequency corresponding to the peak sound pressure as a center frequency, an A-weighting filter, or a B-weighting filter.

The vehicle includes: a camera to acquire image data of the front of the vehicle.

The method further includes: determining whether a pedestrian is present in front of the vehicle based on the image data.

The method further includes: adjusting the frequency of the virtual engine sound to which the amplification filter is applied when the pedestrian is present in front of the vehicle to increase.

The method further includes: controlling the speaker to output a virtual engine sound to which the amplification filter is applied and whose frequency is adjusted.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is a flowchart illustrating a case of outputting a virtual engine sound to which an amplification filter is applied in a method of controlling a vehicle in one form of the present disclosure.

FIG. 7 is a flowchart illustrating a case where a frequency of a virtual engine sound is adjusted in a method of controlling a vehicle in one form of the present disclosure.

Figure 1:
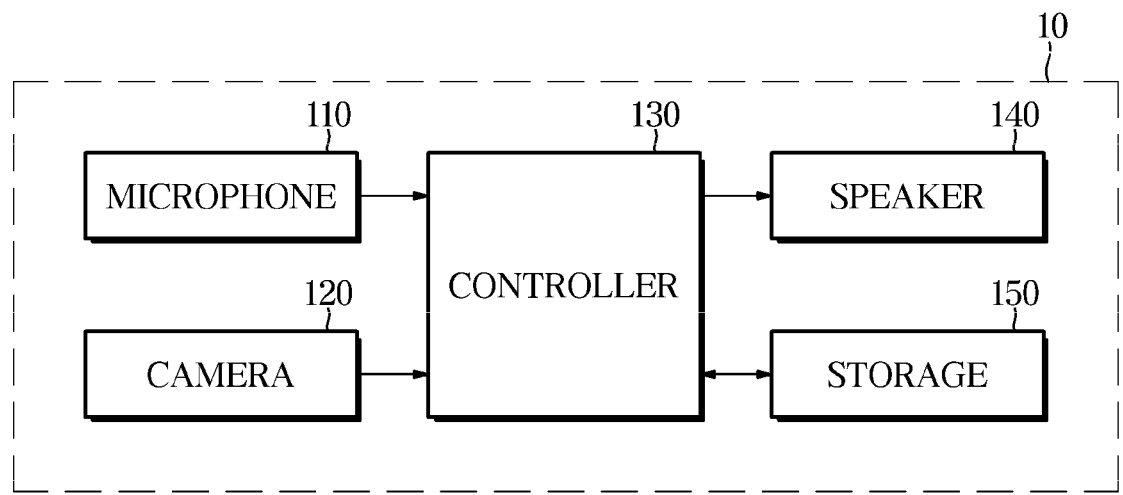
FIG. 1 is a control block diagram of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, some forms of a vehicle and a method of controlling the vehicle according to an aspect will be described in detail with reference to the accompanying drawings.

FIG. 1 is a control block diagram of a vehicle in some forms of the present disclosure.

Referring to FIG. 1, the vehicle 10 in some forms of the present disclosure may include a microphone 110 that receives external sound generated from the outside of the vehicle 10, a camera that acquires image data about the front of the vehicle 10, a controller 130 for adjusting the virtual engine sound based on external noise, speaker 140 for outputting the virtual engine sound to the outside of the vehicle 10 and a storage 150 may store various types of information necessary for controlling the vehicle 10.

The vehicle 10 in some forms of the present disclosure may include a motor (not shown) driven by electricity, and may be an electric power vehicle that obtains power by using a motor (not shown).

In this case, the electric power vehicle may include a battery electric vehicle (BEV), a hybrid electric vehicle (HEV) and a plug-in HEV. Any vehicle that receives power from the motor may be included in the electric power vehicle without limitation.

The microphone 110 in some forms of the present disclosure may be provided in a main body (not shown) of the vehicle 10 to receive external sound generated from the outside. The microphone 110 may be provided without limitation as long as it can receive external sound generated from the outside of the vehicle 10, and the number of installations may be provided without limitation.

In this case, the external sound received by the microphone 110 may include noise generated from the outside and a virtual engine sound output from the speaker 140 of the vehicle 10.

The camera 120 in some forms of the present disclosure may be provided in a main body (not shown) of the vehicle 10 to acquire image data of the front of the vehicle 10 by photographing the front of the vehicle 10. The camera 120 may be provided without limitation as long as it can photograph the front of the vehicle 10, and the number of installation may also be provided without limitation.

The controller 130 in some forms of the present disclosure may extract the noise generated outside the vehicle 10 by separating the virtual engine sound from the external sound received through the microphone 110.

The controller 130 in some forms of the present disclosure may adjust the virtual engine sound based on the extracted noise.

Specifically, the controller 130 may adjust the virtual engine sound by determining a plurality of peak sound pressure of the noise, determining a plurality of EQ (equalizer) filters having each of the plurality of peak sound pressures as a peak point and a predetermined bandwidth, generating an amplification filter by combining the plurality of EQ filters and applying the generated amplification filter to the virtual engine sound currently output.

Thereafter, the controller 130 may control the speaker 140 to output the virtual engine sound to which the amplification filter is applied. Adjusting the virtual engine sound based on the extracted noise will be described in detail later.

The controller 130 in some forms of the present disclosure may determine whether a pedestrian is present in front of the vehicle 10 based on the image data acquired through the camera 120 and adjust the frequency of the virtual engine sound according to whether a pedestrian is present in front of the vehicle 10.

Specifically, when there is a pedestrian in front of the vehicle 10, the controller 130 may adjust the frequency of the virtual engine sound to which the amplification filter is applied to increase.

Thereafter, the controller 130 may control the speaker 140 to output the virtual engine sound to which the amplification filter is applied and whose frequency is adjusted. Adjusting the frequency of the virtual engine sound according to whether the pedestrian is present will be described in detail later.

The controller 130 may include at least one memory in which a program for performing the above-described operation and the operation described later is stored, and at least one processor for executing the stored program. In the case of a plurality of memories and processors, they may be integrated in one chip or may be provided in physically separated locations.

The speaker 140 in some forms of the present disclosure may be provided in a main body (not shown) of the vehicle 10 to output a virtual engine sound to the outside of the vehicle 10. The speaker 140 may be provided without limitation as long as it can output virtual engine sound to the outside of the vehicle 10, and the number of installations may be provided without limitation.

The storage 150 in some forms of the present disclosure may store various information necessary for controlling the vehicle 10, such as data about virtual engine sound, information on bandwidth according to types of EQ filters, a sound processing algorithm for separating and combining sounds, and an image processing algorithm for extracting pedestrians from the image data.

The storage 150 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these.

In the above, each configuration of the vehicle 10 has been described in detail. Hereinafter, adjusting the virtual engine sound based on the noise by the controller 130 of the vehicle 10 is described in detail.

Figure 2:
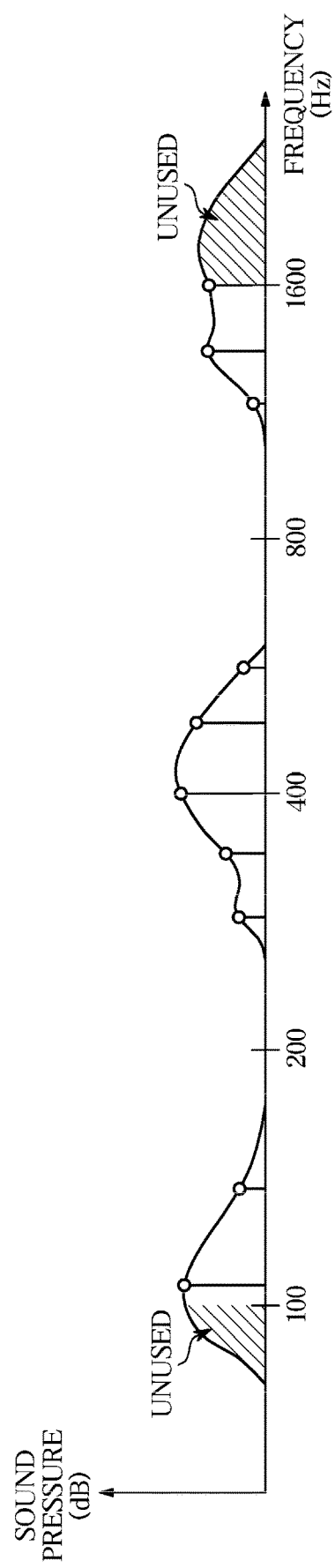
FIG. 2 is a diagram illustrating a case in which a vehicle extracts a peak sound pressure of noise, in one form of the present disclosure.
Figure 3:
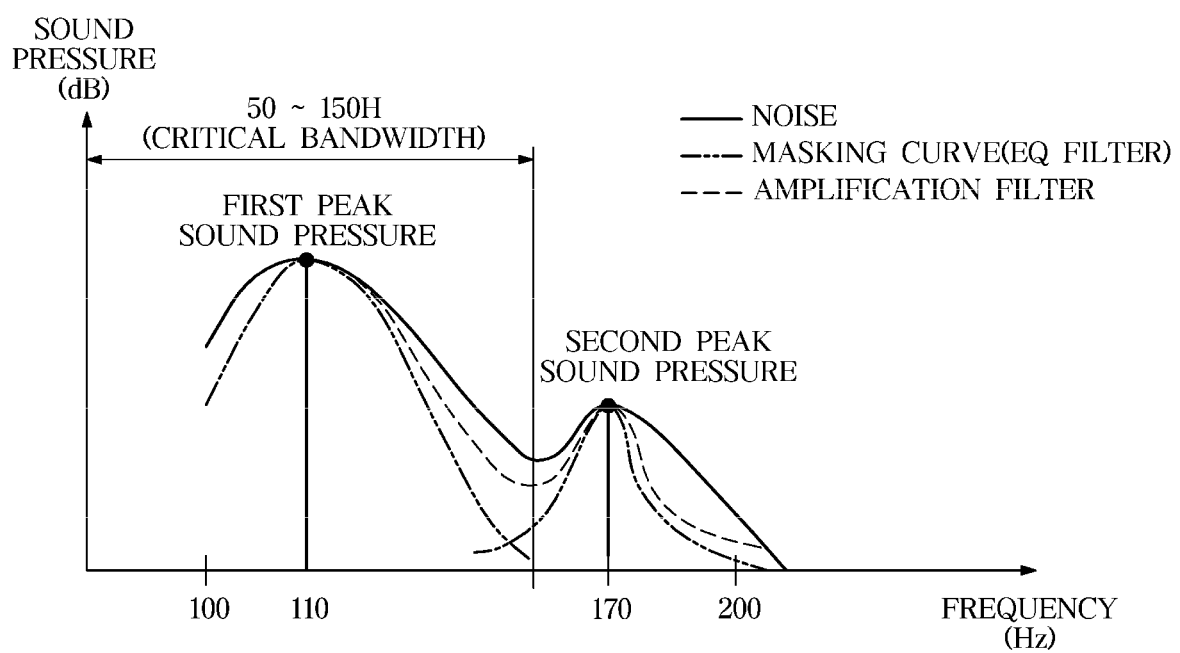
FIG. 3 is a diagram illustrating a case in which a vehicle generates an amplification filter, in one form of the present disclosure.
Figure 4:
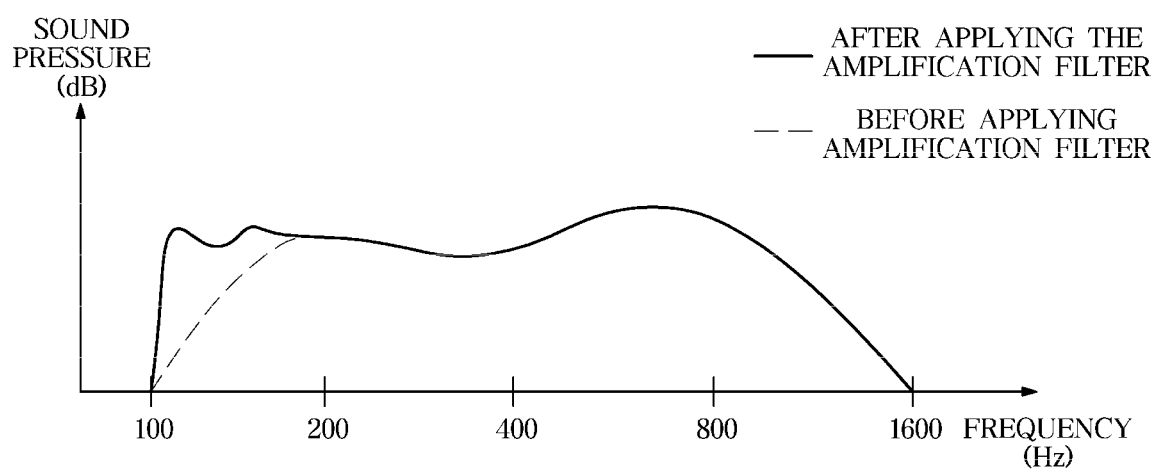
FIG. 4 is a diagram illustrating a case in which a vehicle applies an amplification filter to a virtual engine sound, in one form of the present disclosure.

FIG. 2 is a diagram illustrating a case in which a vehicle extracts a peak sound pressure of noise, in some forms of the present disclosure. FIG. 3 is a diagram illustrating a case in which a vehicle generates an amplification filter, in some forms of the present disclosure. FIG. 4 is a diagram illustrating a case in which a vehicle applies an amplification filter to a virtual engine sound, in some forms of the present disclosure.

The controller 130 in some forms of the present disclosure may separate the virtual engine sound output through the speaker 140 from the external sound received through the microphone 110 to extract noise generated from the outside of the vehicle 10.

FIG. 2 illustrates an example of sound pressure of noise distributed according to frequency, and the noise may indicate irregular sound pressure according to frequency.

As shown in FIG. 2, the controller 130 may determine the peak sound pressure from the extracted noise.

In some forms of the present disclosure, the peak sound pressure may correspond to a sound pressure at a frequency having a higher sound pressure than the surrounding frequency.

In addition, in some forms of the present disclosure, the peak sound pressure may correspond to a sound pressure at a frequency having a higher sound pressure than the surrounding frequency in each of the plurality of regions separated according to the frequency.

In detail, the controller 130 may separate the noise into a plurality of regions according to the frequency, and determine at least one peak sound pressure in each of the plurality of regions.

In this case, the controller 130 may separate a region corresponding to a frequency range (eg, 100 Hz to 1600 Hz) in which the virtual engine sound is output, into a plurality of regions. That is, the controller 130 may not consider noise outside the frequency range in which the virtual engine sound is output (eg, less than 100 Hz and more than 1600 Hz).

In some forms of the present disclosure, the controller 130 may separate the noise so that each of the plurality of regions has the same frequency range, and may separate the noise so that each of the plurality of regions has a different frequency range.

In addition, the controller 130 may separate the noise into a plurality of regions based on the logarithmic scale in some forms of the present disclosure. For example, as illustrated in FIG. 2, the controller 130 may separate noise into a plurality of regions based on 100 Hz, 200 Hz, 400 Hz, 800 Hz, and 1600 Hz. In this way, the controller 130 may separate the plurality of regions according to the octaves, and finally, may control the virtual engine sound for each octave in consideration of the pedestrian's hearing.

In addition, in some forms of the present disclosure, the controller 130 may determine the peak sound pressure such that a frequency between peak sound pressures in the same region is equal to or greater than a critical bandwidth.

In general, a human's hearing has a threshold band for each specific frequency, like a combination of filters for each frequency band. That is, the human hearing processes sound signals for a specific frequency region at once, such as composed of several auditory filters. In this case, the bandwidth corresponding to the specific frequency region is defined as the threshold bandwidth, and the storage 150 stores the threshold bandwidth of the channels corresponding to the auditory filter according to the bandwidth characteristics of the human auditory filter.

That is, the controller 130 may provide a virtual engine sound that does not have a difference in sound quality while finally reducing the amount of calculation by determining the peak sound pressure so that the frequency between the peak sound pressures in the same region is greater than or equal to the threshold bandwidth in the noise separated into the plurality of regions. In other words, the controller 130 may obtain an amplification filter that is most similar to the noise by using a small number of EQ filters by determining the interval between the peak sound pressures above the threshold bandwidth.

For example, as shown in FIG. 3, since the critical bandwidth between 100 Hz and 400 Hz is 100 Hz, the controller 130 may determine 110 Hz as the first peak sound pressure within a range of 50 Hz to the left and right based on 100 Hz. In consideration of the threshold bandwidth, the controller 130 may determine 170 Hz as the second peak sound pressure within a range of 50 Hz to the left and right based on 200 Hz.

After determining the plurality of peak sound pressures of the noise, the controller 130 may determine a plurality of EQ (equalizer) filters having each of the plurality of peak sound pressures of the noise as a peak point and a predetermined bandwidth.

In this case, EQ filter may be any one of a masking curve having a frequency corresponding to the peak sound pressure as a center frequency, an A-weighting filter, or a B-weighting filter. In addition, the storage 150 may store information about the correlation between the type of the EQ filter and the quality factor (Q factor). That is, the storage 150 may store the quality factor according to the type of the EQ filter, and the controller 130 may determine the bandwidth corresponding to the type of the EQ filter based on the quality factor according to the type of the EQ filter.

For example, as shown in FIG. 3, The controller 130 may determine a masking curve having a first peak sound pressure as the peak point and having a frequency corresponding to the first peak sound pressure as the center frequency, as the first EQ filter corresponding to the first peak sound pressure.

The controller 130 may determine a masking curve having a second peak sound pressure as the peak point and having a frequency corresponding to the second peak sound pressure as the center frequency, as the first EQ filter corresponding to the second peak sound pressure.

The controller 130 in some forms of the present disclosure may generate an amplification filter by combining the determined plurality of EQ filters.

For example, as shown in FIG. 3, The controller 130 may generate an amplification filter by combining the first EQ filter corresponding to the first peak sound pressure and the second EQ filter corresponding to the second peak sound pressure.

In this case, the amplification filter is a filter applied to the virtual engine sound output through the speaker 140, and the controller 130 may apply the amplification filter to the virtual engine sound output through the speaker 140.

For example, as shown in FIG. 4, the controller 130 may amplify a frequency region of a virtual engine sound that may be masked by noise by adding an amplification filter to the virtual engine sound output at frequencies between 100 Hz and 1600 Hz.

Thereafter, the controller 130 may control the speaker 140 to output the virtual engine sound to which the amplification filter is applied.

In the above, adjusting the virtual engine sound based on the noise by the controller 130 of the vehicle 10 has been described in detail. Hereinafter, adjusting the frequency of the virtual engine sound according to whether the pedestrian is present by the controller 130 of the vehicle 10 will be described in detail.

Figure 5:
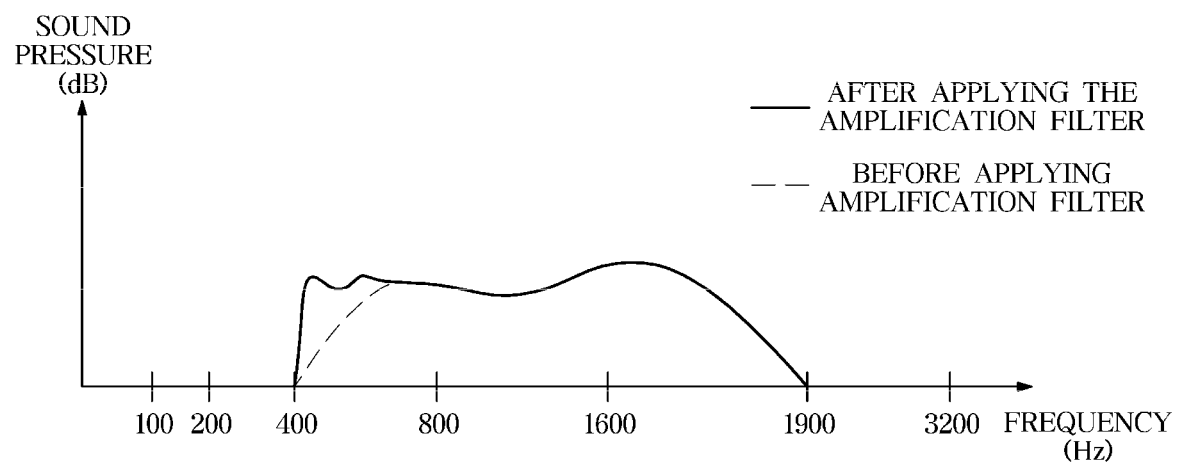
FIG. 5 is a diagram illustrating a case in which a vehicle adjusts a frequency of a virtual engine sound, in one form of the present disclosure.

FIG. 5 is a diagram illustrating a case in which a vehicle adjusts a frequency of a virtual engine sound, in some forms of the present disclosure.

The controller 130 in some forms of the present disclosure may determine whether a pedestrian is present in front of the vehicle 10 based on the image data acquired through the camera 120 and may adjust the frequency of the virtual engine sound according to whether a pedestrian is present in front of the vehicle 10.

Specifically, when there is a pedestrian in front of the vehicle 10, the controller 130 may adjust the frequency of the virtual engine sound to which the amplification filter is applied to increase.

For example, as shown in FIG. 5, when there is a pedestrian in front of the vehicle 10, the controller 130 may adjust the frequency of the virtual engine sound to which the amplification filter is applied, to increase by shifting the entire frequency of the virtual engine sound to which the amplification filter is applied, by 300 Hz.

Thereafter, the controller 130 may control the speaker to output a virtual engine sound to which the amplification filter is applied and whose frequency is adjusted. Through this, the cognitive power about the vehicle of the pedestrian located in front of the vehicle 10 may be improved.

Hereinafter, a method of controlling the vehicle 10 in some forms of the present disclosure will be described. In the description of the method of controlling the vehicle 10, the vehicle 10 in some forms of the present disclosure may be used. Therefore, the contents described above with reference to FIG. 1 to FIG. 5 may be equally applied to the method of controlling the vehicle 10.

FIG. 6 is a flowchart illustrating a case of outputting a virtual engine sound to which an amplification filter is applied in a method of controlling a vehicle in some forms of the present disclosure.

Referring to FIG. 6, the vehicle 10 in some forms of the present disclosure may extract noise by separating a virtual engine sound from an external sound (610).

That is, the controller 130 of the vehicle 10 may extract noise by removing the virtual engine sound reproduced through the speaker 140 from the external sound received through the microphone 110.

The vehicle 10 in some forms of the present disclosure may determine a plurality of EQ (equalizer) filters having each of the plurality of peak sound pressures of the noise as a peak point and a predetermined bandwidth (620).

That is, the controller 130 of the vehicle 10 may determine the peak sound pressure from the extracted noise.

In detail, the controller 130 may separate the noise into a plurality of regions according to the frequency, and determine at least one peak sound pressure in each of the plurality of regions.

At this time, the controller 130 may separate the noise into a plurality of regions based on the logarithmic scale according to the form.

In addition, in some forms of the present disclosure, the controller 130 may determine the peak sound pressure such that a frequency between peak sound pressures in the same region is equal to or greater than a critical bandwidth.

After determining the plurality of peak sound pressures of the noise, the controller 130 may determine a plurality of EQ (equalizer) filters having each of the plurality of peak sound pressures of the noise as a peak point and a predetermined bandwidth.

In this case, EQ filter may be any one of a masking curve having a frequency corresponding to the peak sound pressure as a center frequency, an A-weighting filter, or a B-weighting filter.

The vehicle 10 in some forms of the present disclosure may generate an amplification filter by combining a plurality of EQ filters (630) and apply the amplification filter to a virtual engine sound (640).

In this case, the amplification filter is a filter applied to the virtual engine sound output through the speaker 140, and the controller 130 may apply the amplification filter to the virtual engine sound output through the speaker 140.

Thereafter, the vehicle 10 may control the speaker 140 to output the virtual engine sound to which the amplification filter is applied (650).

FIG. 7 is a flowchart illustrating a case where a frequency of a virtual engine sound is adjusted in a method of controlling a vehicle in some forms of the present disclosure.

Referring to FIG. 7, the vehicle 10 in some forms of the present disclosure may acquire image data about the front of the vehicle 10 (710).

When there is a pedestrian in front of the vehicle 10 (720), the vehicle 10 may adjust the frequency of the virtual engine sound to which the amplification filter is applied to increase (730).

That is, the controller 130 in some forms of the present disclosure may determine whether a pedestrian is present in front of the vehicle 10 based on the image data acquired through the camera 120 and when there is a pedestrian in front of the vehicle 10, may adjust the frequency of the virtual engine sound to which the amplification filter is applied to increase.

Thereafter, the vehicle 10 may control the speaker 140 to output the virtual engine sound to which the amplification filter is applied and whose frequency is adjusted (740). Through this, the cognitive power about the vehicle of the pedestrian located in front of the vehicle 10 may be improved.

According to the vehicle and the method of controlling the vehicle in some forms of the present disclosure, by adjusting the sound pressure of the virtual engine sound based on the external noise, even in situations where there is a lot of external noise, pedestrians can recognize the approach of the vehicle, thereby reducing the possibility of an accident.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
   a speaker configured to output a virtual engine sound;
   a microphone configured to receive external sound generated outside of the vehicle; and
   a controller configured to:
   extract a noise by separating the virtual engine sound from the external sound;
   determine each peak sound pressure of a plurality of peak sound pressures as a peak point;
   identify a plurality of equalizer (EQ) filters having a predetermined bandwidth;
   generate an amplification filter by combining the plurality of EQ filters;
   apply the amplification filter to the virtual engine sound;
   control the speaker to output the virtual engine sound;
   divide the noise into a plurality of regions based on a frequency; and
   determine at least one peak sound pressure in each region of the plurality of regions.

2. The vehicle of claim 1, wherein the controller is configured to:
   divide a region corresponding to a frequency range in which the virtual engine sound is output among the noise into a plurality of regions.

3. The vehicle of claim 1, wherein the controller is configured to:
   divide the noise into the plurality of regions based on a logarithmic scale.

4. The vehicle of claim 1, wherein the controller is configured to:
   determine the peak sound pressure such that a frequency between peak sound pressures in a same region is equal to or greater than a critical bandwidth.

5. The vehicle of claim 1, wherein the EQ filter is at least one of a masking curve having a frequency corresponding to the peak sound pressure as a center frequency, an A-weighting filter, or a B-weighting filter.

6. The vehicle of claim 1, wherein the vehicle further comprises:
   a camera configured to acquire image data of a front side of the vehicle.

7. The vehicle of claim 6, wherein the controller is configured to:
   determine whether a pedestrian is present in the front side of the vehicle based on the image data.

8. The vehicle of claim 7, wherein the controller is configured to:
   increase a frequency of the virtual engine sound when the pedestrian is present in the front side of the vehicle.

9. The vehicle of claim 8, wherein the controller is configured to:
   control the speaker to output the virtual engine sound having the increased frequency.

10. A method of controlling a vehicle comprising:
    extracting a noise, by a controller, by separating a virtual engine sound from an external sound;
    determining, by the controller, each peak sound pressure of a plurality of peak sound pressures as a peak point;
    identifying, by the controller, a plurality of equalizer (EQ) filters having a predetermined bandwidth;
    generating, by the controller, an amplification filter by combining the plurality of EQ filters;
    applying, by the controller, the amplification filter to the virtual engine sound;
    controlling, by the controller, a speaker to output the virtual engine sound;
    dividing, by the controller, the noise into a plurality of regions based on a frequency; and
    determining, by the controller, at least one peak sound pressure in each region of the plurality of regions.

11. The method of claim 10, wherein dividing the noise into the plurality of regions comprises:
    dividing a region corresponding to a frequency range in which the virtual engine sound is output among the noise into a plurality of regions.

12. The method of claim 10, wherein dividing the noise into the plurality of regions comprises:
    dividing the noise into the plurality of regions based on a logarithmic scale.

13. The method of claim 10, wherein determining at least one peak sound pressure comprises:
   determining the peak sound pressure such that a frequency between peak sound pressures in a same region is equal to or greater than a critical bandwidth.

14. The method of claim 10, wherein the EQ filter is at least one of a masking curve having a frequency corresponding to the peak sound pressure as a center frequency, an A-weighting filter, or a B-weighting filter.

15. The method of claim 10, wherein the method comprises:
   acquiring, by a camera, image data of a front side of the vehicle.

16. The method of claim 15, wherein the method further comprises:
   determining whether a pedestrian is present in the front side of the vehicle based on the image data.

17. The method of claim 16, wherein the method further comprises:
   increasing a frequency of the virtual engine sound when the pedestrian is present in the front side of the vehicle.

18. The method of claim 17, wherein the method further comprises:
   controlling the speaker to output the virtual engine sound having the increased frequency.

* * * * *